United States Patent
Messian

(10) Patent No.: US 8,413,370 B2
(45) Date of Patent: Apr. 9, 2013

(54) BEDBUG TRAP

(75) Inventor: Gilles Messian, La Garennes-colombes (FR)

(73) Assignee: Dakem, Courbevoie (FR)

( * ) Notice: Subject to any disclaimer, the term of this patent is extended or adjusted under 35 U.S.C. 154(b) by 0 days.

(21) Appl. No.: 12/998,399

(22) PCT Filed: Oct. 2, 2009

(86) PCT No.: PCT/IB2009/054328
§ 371 (c)(1), (2), (4) Date: May 13, 2011

(87) PCT Pub. No.: WO2010/043995
PCT Pub. Date: Apr. 22, 2010

(65) Prior Publication Data
US 2011/0203158 A1    Aug. 25, 2011

(30) Foreign Application Priority Data
Oct. 17, 2008 (FR) .................... 08 57088

(51) Int. Cl.
*A01M 1/14* (2006.01)
(52) U.S. Cl.
USPC .............................. 43/114; 43/123
(58) Field of Classification Search ............ 43/107, 43/114–117, 123
See application file for complete search history.

(56) References Cited

U.S. PATENT DOCUMENTS

| | | | | |
|---|---|---|---|---|
| 274,425 A * | 3/1883 | Wells | ................ | 239/55 |
| 431,537 A * | 7/1890 | Trenner | ................ | 43/114 |
| 466,637 A * | 1/1892 | Thum | ................ | 43/114 |
| 469,021 A * | 2/1892 | Smith | ................ | 43/114 |
| 1,261,842 A * | 4/1918 | Muller | ................ | 43/123 |
| 3,304,646 A * | 2/1967 | Staley | ................ | 43/131 |
| 4,217,722 A * | 8/1980 | McMullen | ................ | 43/114 |
| 5,157,866 A * | 10/1992 | Rosie | ................ | 43/121 |
| 5,394,640 A * | 3/1995 | Musket | ................ | 43/114 |
| 5,454,186 A | 10/1995 | Gang | | |
| 2010/0011655 A1 * | 1/2010 | Frisch | ................ | 43/114 |

FOREIGN PATENT DOCUMENTS

DE    207 643    4/1907
WO    WO 2007/027601    3/2007

* cited by examiner

*Primary Examiner* — Kimberly Berona
(74) *Attorney, Agent, or Firm* — Welsh Flaxman & Gitler LLC

(57) ABSTRACT

A bedbug trap having at least a first plane panel of fibrous material and a second panel of fibrous material, the first panel having a zone covered in an adhesive for fastening to the second panel, the second panel including a strip of adhesive on at least one face, which adhesive strip is of a width that is less than the width of the first panel, and the first panel including a zone that is covered in an adhesive that is located at a distance from and facing the adhesive strip, wherein the second panel is plane, and the first and second panels are made of respective first and second portions of a single initial plane panel of fibrous material that is previously coated in adhesive and then folded in half so that the first portion and the second portion face each other, the adhesive strip extending over the second portion of the initial panel, being prolonged over the first portion of the initial panel, the fastening zone between the first and second portions of the initial panel being implemented by adhesive spots placed on the initial panel and of thickness greater than the thickness of the prolonged adhesive strip, thereby forming channels.

6 Claims, 1 Drawing Sheet

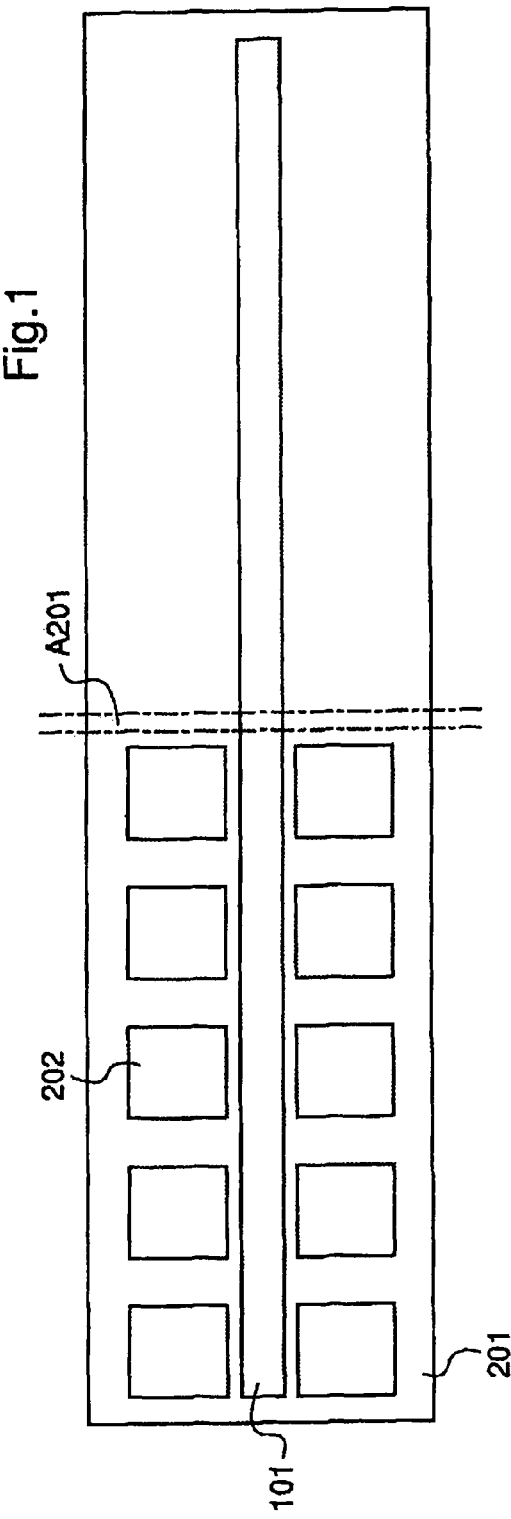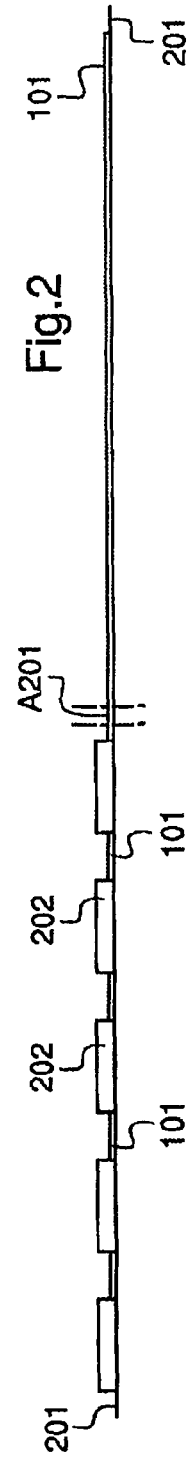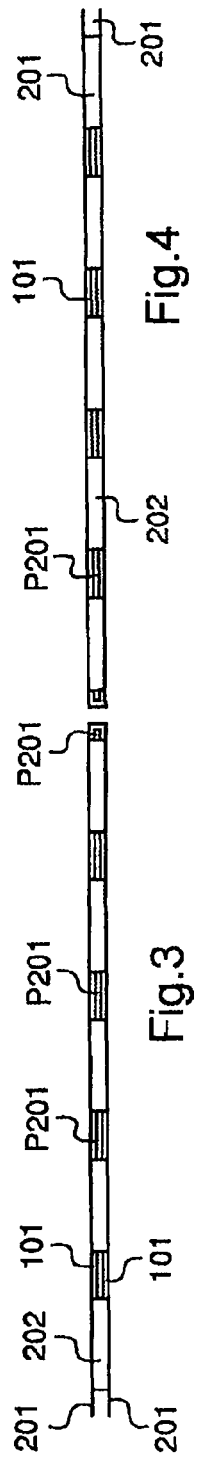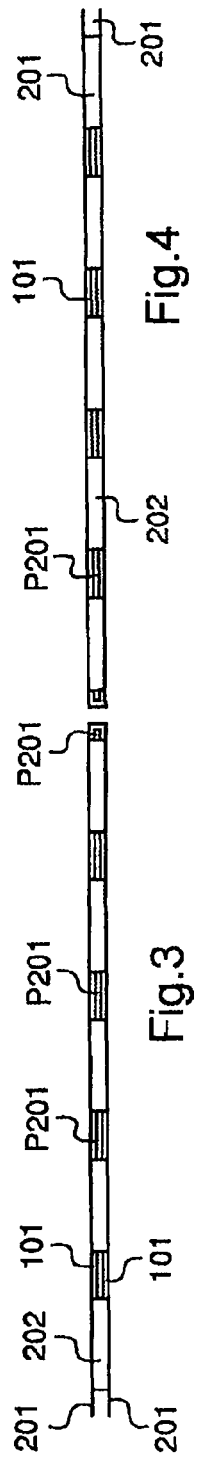

BEDBUG TRAP

FIELD OF THE INVENTION

The present invention relates to the field of dealing with pests. More particularly, the invention relates to capturing bedbugs.

BACKGROUND OF THE INVENTION

Bedbugs (*Cimex lectularius*) are insects that are particularly robust and difficult to eliminate. Thus, it is important to detect them or to eliminate them as soon as possible, e.g. by capturing them.

Patent application WO 2007/027601 describes a device for capturing bedbugs so as to destroy them or monitor their population. Another type of bedbug trap is described in DE 207643 C. Nevertheless, known traps are not adapted to capturing individuals of all sizes, whether juvenile or adult. Thus, bedbugs may often take refuge inside traps, or behind a trap. The effectiveness of such traps needs to be improved in order to achieve better elimination or better control of bedbugs.

OBJECT AND SUMMARY OF THE INVENTION

An object of the present invention is thus to mitigate one or more of the drawbacks of the prior art, in particular by means of a bedbug trap comprising at least a first plane panel of fibrous material and a second panel of fibrous material, the first panel having a zone covered in an adhesive for fastening to the second panel, the second panel including a strip of adhesive on at least one face, which adhesive strip is of a width that is less than the width of the first panel, and the first panel including a zone that is covered in an adhesive that is located at a distance from and facing the adhesive strip, wherein the second panel is plane, and the first and second panels are made of respective first and second portions of a single initial plane panel of fibrous material that is previously coated in adhesive and then folded in half so that the first portion and the second portion face each other, the adhesive strip extending over the second portion of the initial panel, being prolonged over the first portion of the initial panel, the fastening zone between the first and second portions of the initial panel being implemented by adhesive spots placed on the initial panel and of thickness greater than the thickness of the prolonged adhesive strip, thereby forming channels.

According to a feature of the invention, the prolonged adhesive strip extends perpendicularly to an axis whereby the initial panel is folded in half, so as to form two prolonged adhesive strip portions that are placed facing each other in the folded position.

According to another feature, the prolonged adhesive strip extends parallel to an edge of the initial panel.

According to another feature, the adhesive spots are placed on only one of the two portions of the initial panel and on either side of the prolonged adhesive strip.

According to another feature, the adhesive spots are in alignment along rows and columns so as to form passages presenting lateral sides that are sticky.

According to another feature, the panels are made of card.

In non-limiting manner, the trap of the invention may be placed close to places where bedbugs hide or pass, such as baseboards or skirting boards, headboards or footboards of beds, frames for mattresses, or other locations having cracks or porous material or rough material such as wood, card, or thick paper and that are attractive to bedbugs.

BRIEF DESCRIPTION OF THE DRAWING

The invention can be better understood on reading the following detailed description, on reading a non-limiting example of the invention, and on examining the accompanying drawing, in which:

FIG. 1 is a plan view of an example of elements for fabricating a trap of the invention while it is being prepared;

FIG. 2 is a side view of the trap elements of FIG. 1; and

FIGS. 3 and 4 are side views from two opposite points of view of an example trap.

MORE DETAILED DESCRIPTION

FIG. 1 shows an embodiment of the invention made from a plane piece of card (201) having a strip (101) of adhesive placed thereon, the card being rectangular, for example, and the adhesive strip (101) being longitudinal, for example, and extending over the entire length of the card. By way of example, the plane card (201) is for folding in half along a middle axis (A201), so as to form two portions of card that face each other and that are joined together by one narrow edge corresponding to the pivot axis, e.g. having two fold lines. By way of example, the fold zone (A201) is a zone of determined width corresponding to the height of the trap and designed to be placed at right angles relative to the two main portions of the card medium (201). By way of example, thick spots (202) of adhesive are located along each side of the adhesive strip (101). In non-limiting manner, the card medium (201) may also form a trap that is square, or triangular, or round, or oval, or of any geometrical shape. The thick adhesive spots (202) are disposed on either side of the narrow adhesive strip (101), and by way of example they are of a thickness that is more than twice the thickness of the adhesive strip (101). Once the card has been folded in half, these spots (202) serve to join together the facing faces of the two portions folded one onto the other.

FIG. 2 is a side view of elements for fabricating the bedbug capture device of the invention. In non-limiting manner, the spots may be placed on one side of the card as split in two by the fold zone (A201).

FIGS. 3 and 4 are views of the capture device ready for use. By way of example, FIG. 3 is a side view, while FIG. 4 is a side view from an opposite point of view. The card (201) is folded in half, the adhesive spots (202) joining together the two portions of the card. The narrow adhesive strip (101) faces itself, and a passage (P201) is left between these two adhesive strips. Two separate cards could equally well be placed facing each other to make a similar part, but fabrication by folding is easier to perform.

In non-limiting manner, the spots are arranged in matrices or in rows or in columns, for example. In this way, the adhesive spots (202) joining together the two surfaces define a passage for bedbugs, the passage having its lateral sides coated in adhesive. Bedbugs can thus become stuck to the sides of the adhesive spots (202).

The medium (201) may be card or thick paper or some other fibrous material. The adhesive spots arranged, as shown in FIG. 1, on either side of the longitudinal adhesive strip may also be in contact with the longitudinal strip (101). The narrow adhesive strip (101) that is folded in half to form a trapping passage is particularly advantageous since the top and bottom surfaces of the passage, in the zone including the adhesive strip, are both coated in adhesive. By way of example, the fold axis is taken perpendicularly to the narrow adhesive strip or in such a manner that the strip is folded onto itself, at least in part. Thus, bedbugs passing along the passage (P201) remain trapped against the bottom wall or the top wall. A bait may also be provided in the trap, for example the card may be soaked in a liquid containing pheromones that are attractive to bedbugs. Even without any bait, the trap of the invention constitutes a location that is particularly attractive for bedbugs since it provides narrow passages that can be occupied by the bedbugs. However, and in advantageous manner, the trap of the invention is made so that bedbugs, regardless of their size, are trapped and held on an adhesive.

By way of example, a method of fabricating a bedbug trap comprises a step of applying adhesive to at least first and second surfaces of at least one plane panel of fibrous material, the first surface and the second surface being designed to face each other while being spaced apart so as to form a passage along which bedbugs can travel.

The step of applying adhesive comprises applying an adhesive strip (101) over the entire length of the panel and it is followed by a step of folding the panel along a fold zone or axis (A201) that is perpendicular to the adhesive strip, the panel being folded in half so as to retain some minimum distance between the adhesive-coated surfaces that are placed facing each other. The folding step is preceded by a step of applying adhesive spots (202) of thickness that is greater than twice the thickness of the adhesive strip (101) so that after folding they join together a first portion of the panel and a second portion of the panel, which portions were initially located on either side of the fold axis.

By means of the present invention, bedbugs of all sizes can be caught. After capturing bedbugs, and in non-limiting manner, the trap may for example be taken apart by the user to verify whether or not the place where the trap was laid is infested by bedbugs. After optionally inspecting the trap, the user may discard the trap in a trashcan or burn it in an incinerator. The trap is particularly economic in terms of raw materials and it is simple to fabricate. The trap may be made to have any size lying in the range one or a few centimeters to tens of centimeters, while remaining lightweight and easy to install.

The present invention is not limited to the above-described example and modifications that are obvious to the person skilled in the art come within the ambit of the present invention as defined by the accompanying claims.

What is claimed is:

1. A bedbug trap comprising:
    a piece of card including a first panel of fibrous material lying in a first plane and a second panel of fibrous material lying in a second plane,
    the first panel having a zone covered in adhesive spots for fastening to the second panel,
    a strip of adhesive on a face of the piece of card such that the strip of adhesive extends along both the first panel and the second panel, the zone of the first panel covered in the adhesive spots being spaced from the strip of adhesive, the adhesive strip is of a width that is less than a width of the first panel and the second panel and a thickness of the adhesive spots of the first panel being greater than the thickness of the adhesive strip,
    wherein the first and second panels are made of respective first and second portions of the piece of card which is folded in half so that the first portion and the second portion face each other with that portion of the adhesive strip extending along the first panel extending over the that portion of the adhesive strip extending along the second panel, a fastening zone between the first and second portions of the first and second panel being implemented by the adhesive spots placed on the first panel and, wherein relative thicknesses of the adhesive spot and the adhesive strip forms channels.

2. The bedbug trap according to claim 1, wherein the adhesive strip extends perpendicularly to an axis whereby the piece of card is folded in half, so as to form two prolonged adhesive strip portions that are placed facing each other in the folded position.

3. The bedbug trap according to claim 1, wherein the adhesive strip extends parallel to an edge of the piece of card.

4. The bedbug trap according to claim 1, wherein the adhesive spots are placed on only the first panel and on either side of the adhesive strip.

5. The bedbug trap according to claim 4, wherein the adhesive spots are in alignment along rows and columns so as to form passages presenting lateral sides that are sticky.

6. The bedbug trap according to claim 1, wherein the first and second panels are made of card material.

* * * * *